United States Patent
Stoll et al.

(10) Patent No.: US 6,968,505 B2
(45) Date of Patent: Nov. 22, 2005

(54) USE OF CONCEPTUAL DIAGRAMS TO SUPPORT RELATIONSHIPS BETWEEN LAUNCHPADS AND ITS WIZARDS

(75) Inventors: Maria Teresa de Jesus Stoll, El Cerrito, CA (US); Daina Pupons Wickham, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/844,688

(22) Filed: Apr. 27, 2001

(65) Prior Publication Data

US 2002/0158894 A1  Oct. 31, 2002

(51) Int. Cl.⁷ ................................................ G09G 5/00
(52) U.S. Cl. ...................................... 715/712; 715/734
(58) Field of Search ............................... 345/768, 767, 345/826, 825, 771, 772, 773, 705, 706, 707, 345/708, 709, 711, 712–713; 717/1, 11; 707/102; 715/802, 805, 804, 965, 709, 708, 714, 712–713, 715/711, 734–737, 739, 853–855, 741–743, 715/738, 769

(56) References Cited

U.S. PATENT DOCUMENTS

| | | | |
|---|---|---|---|
| 5,745,713 A | 4/1998 | Ferguson et al. | |
| 6,049,673 A | 4/2000 | McComb et al. | |
| 6,053,951 A | 4/2000 | McDonald et al. | |
| 6,066,182 A | 5/2000 | Wilde et al. | |
| 6,205,527 B1 * | 3/2001 | Goshey et al. | 711/162 |
| 6,233,726 B1 * | 5/2001 | Bowman et al. | 717/107 |
| 6,401,230 B1 * | 6/2002 | Ahanessians et al. | 716/1 |
| 6,476,830 B1 * | 11/2002 | Farmer et al. | 715/769 |
| 6,698,018 B1 * | 2/2004 | Zimniewicz et al. | 717/175 |
| 6,833,847 B1 * | 12/2004 | Boegner et al. | 715/705 |

OTHER PUBLICATIONS

Stoll, Maria et al., "Visual Wizard Launch Pad," U.S. Appl. No. 09/468,718, filed Dec. 21, 1999, pp. 1-27 and 16 sheets of drawings.

* cited by examiner

Primary Examiner—Steven P Sax
(74) Attorney, Agent, or Firm—Sawyer Law Group LLP

(57) ABSTRACT

The present invention provides launch pads on the display of a computer system as interactive interfaces between a user and wizards. The present invention includes: (a) providing a link on a launch pad, where the link is associated with a wizard, where the launch pad comprises a first visual object, where the first visual object in the launch pad relates to the task performed by the wizard; and providing the wizard when the link is selected, where the wizard comprises a second visual object, where the second visual object is associated with the first visual object. In the preferred embodiment, the second visual object in the wizard provides more information concerning the task than the first visual object. In this manner, a user is provided a visual connection between the information provided on the launch pad and the information provided on the wizard concerning the task performed by the wizard.

12 Claims, 12 Drawing Sheets

USE OF CONCEPTUAL DIAGRAMS TO SUPPORT RELATIONSHIPS BETWEEN LAUNCHPADS AND ITS WIZARDS

FIELD OF THE INVENTION

The present invention relates to computer systems, and more particularly to graphical user interfaces in computer systems.

BACKGROUND OF THE INVENTION

Many software applications provide "wizards" to guide and assist users to perform specific tasks through the applications. Several wizards may also exist for each application. FIG. 1 illustrates a conventional workstation or computer which has wizards. Several wizards 102 exist on the computer 104. The user 106 must know which of the wizards 102 to execute to perform a particular function. However, frequently several tasks, each with its own wizard, must be executed in order to perform the function. In this situation, the user 106 must know which wizards 102 to execute, how the wizards 102 relate to each other, and in which order the wizards 102 are to be executed in order to perform the function properly.

For example, assume that the user 106 wishes to replicate data in a database system. In order to do so, the user 106 needs to perform four tasks: setup, define the source, define the subscription, and capture or apply. Assume also that there is a wizard 102 for each of these tasks. In order to perform the replication, the user 106 must execute the setup wizard, the define source wizard, the define subscription wizard, and the capture/apply wizard, in this order. However, the user 106 may be a novice or unfamiliar with the database system, or may be dealing with a complex database system. Thus, the user 106 may not understand the system enough to know which wizards 102 to execute and when. The user 106 may not even know what wizards 102 exist to help him/her perform the replication function. In addition, conventional wizards typically comprises generic visual objects or images. These generic images relate generally to the task(s) they represent, but they do not assist the user in understanding the relationships between the tasks for a complex database system. The user 106 must then expend time and energy to learn or discover how to use the wizards. This leads to a high risk of mistakes and a loss of productivity which increases costs to the database owner.

Accordingly, there exists a need for a method for providing an improved interface between a user and wizards in a computer system. The present invention addresses such a need.

SUMMARY OF THE INVENTION

The present invention provides launch pads on the display of a computer system as interactive interfaces between a user and wizards. The present invention includes: (a) providing a link on a launch pad, where the link is associated with a wizard, where the launch pad comprises a first visual object, where the first visual object in the launch pad relates to the task performed by the wizard; and providing the wizard when the link is selected, where the wizard comprises a second visual object, where the second visual object is associated with the first visual object. In the preferred embodiment, the second visual object in the wizard provides more information concerning the task than the first visual object. In this manner, a user is provided a visual connection between the information provided on the launch pad and the information provided on the wizard concerning the task performed by the wizard.

DETAILED DESCRIPTION

The present invention provides an improved interface between a user and wizards in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides launch pads on the display of a computer system as interactive interfaces between a user and wizards which exist on the computer system. A launch pad comprises a first visual object, and a wizard comprises a second visual object which is associated with the first visual object. "Visual objects", as used in this specification, refer to graphical elements which represent hardware and/or software elements of an application affected by the execution of a wizard. In the preferred embodiment, the first visual object in the launch pad relates to the task performed by the wizard. The second visual object in the wizard provides more information concerning the task than the first visual object. In this manner, a user is provided a visual connection between the information provided on the launch pad and the information provided on the wizard concerning the task performed by the wizard.

To more particularly describe the features of the present invention, please refer to FIGS. 2 through 9 in conjunction with the discussion below.

Figure 1:
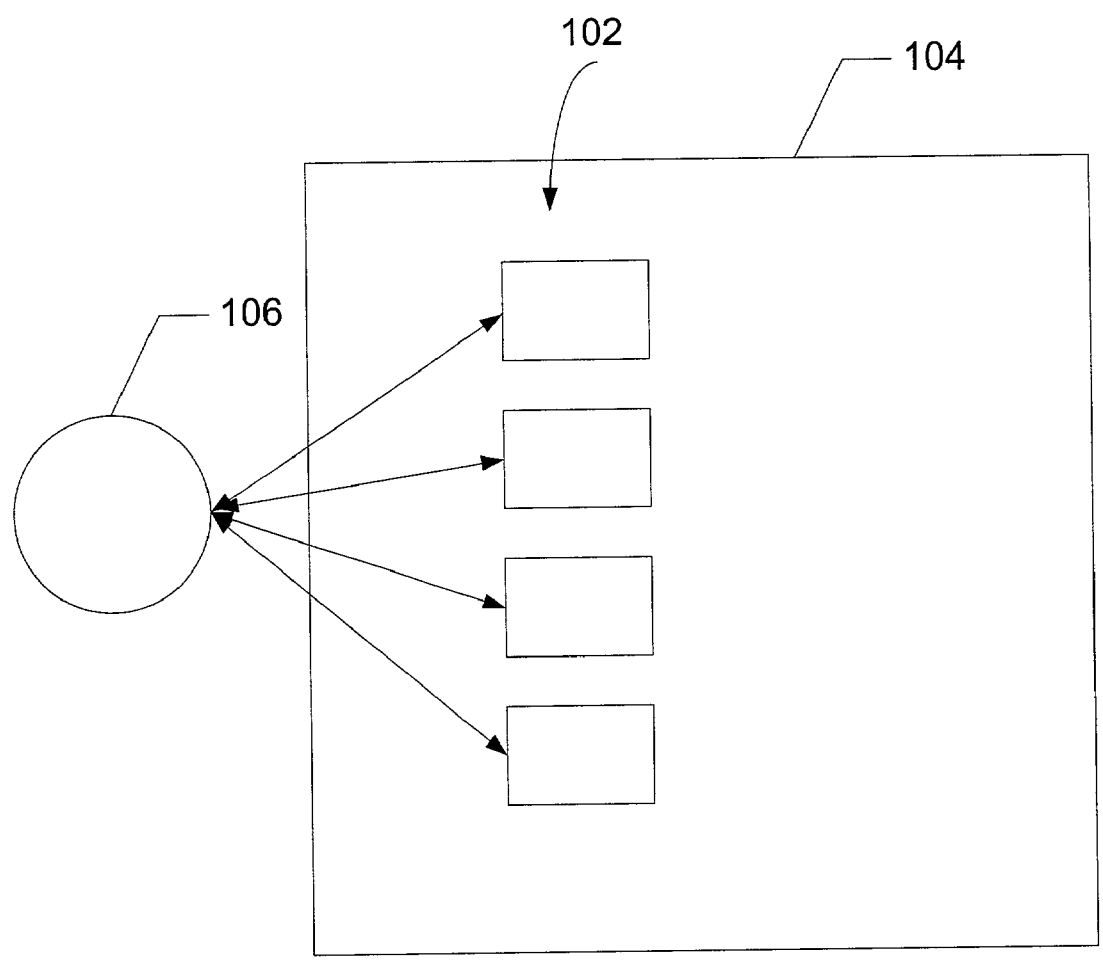
FIG. 1 illustrates a conventional workstation or computer which has wizards.
Figure 2:
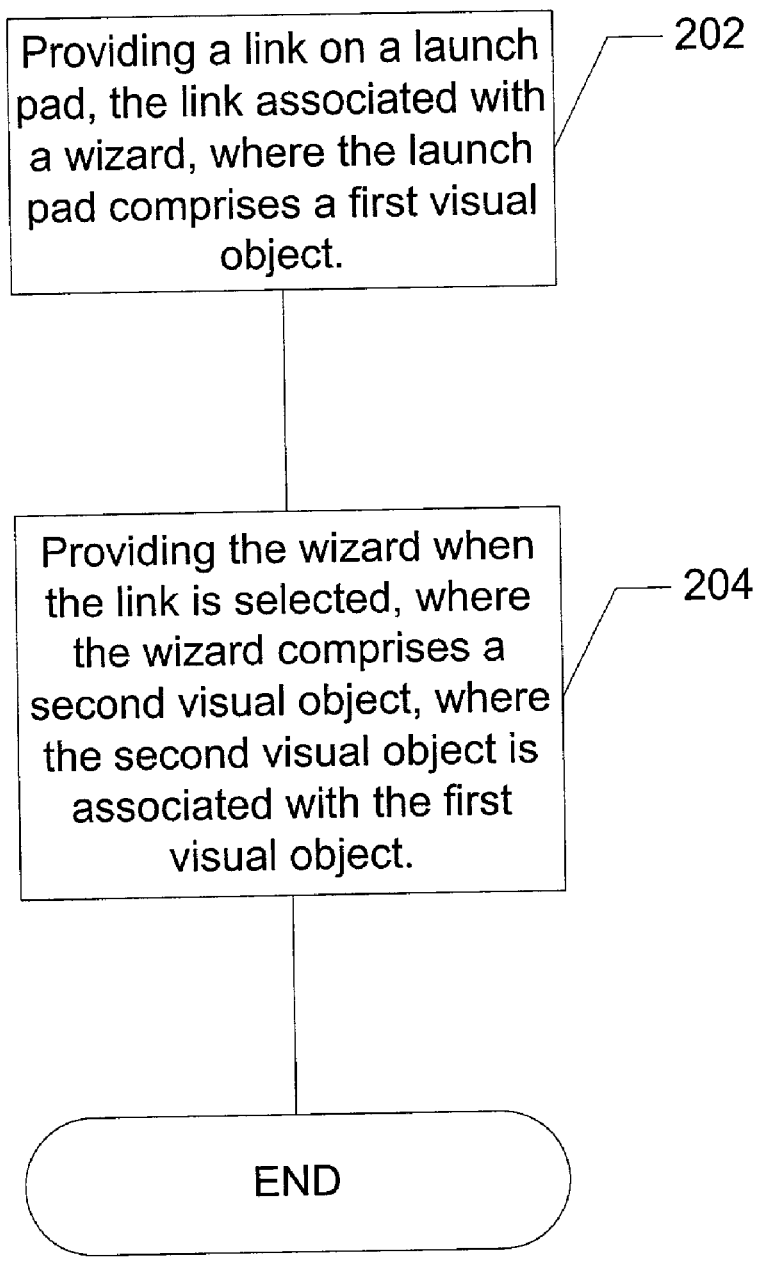
FIG. 2 is a flow chart illustrating a method for providing an interface with wizards in a computer system in accordance with the present invention.

FIG. 2 is a flow chart illustrating a method for providing an interface with wizards in a computer system in accordance with the present invention. First, a link associated with a wizard is provided on a launch pad, where the launch pad comprises a first visual object, via step 202. In the preferred embodiment, the first visual object provides information concerning a task performed by the wizard. Selection of the link launches or executes the wizard. When the link is selected, the wizard is provided, via step 204, where the wizard comprises a second visual object. The second visual object is associated with the first visual object. In the preferred embodiment, the second visual object displays more information concerning the task performed by the wizard than the first visual object in the launch pad.

Figure 3:
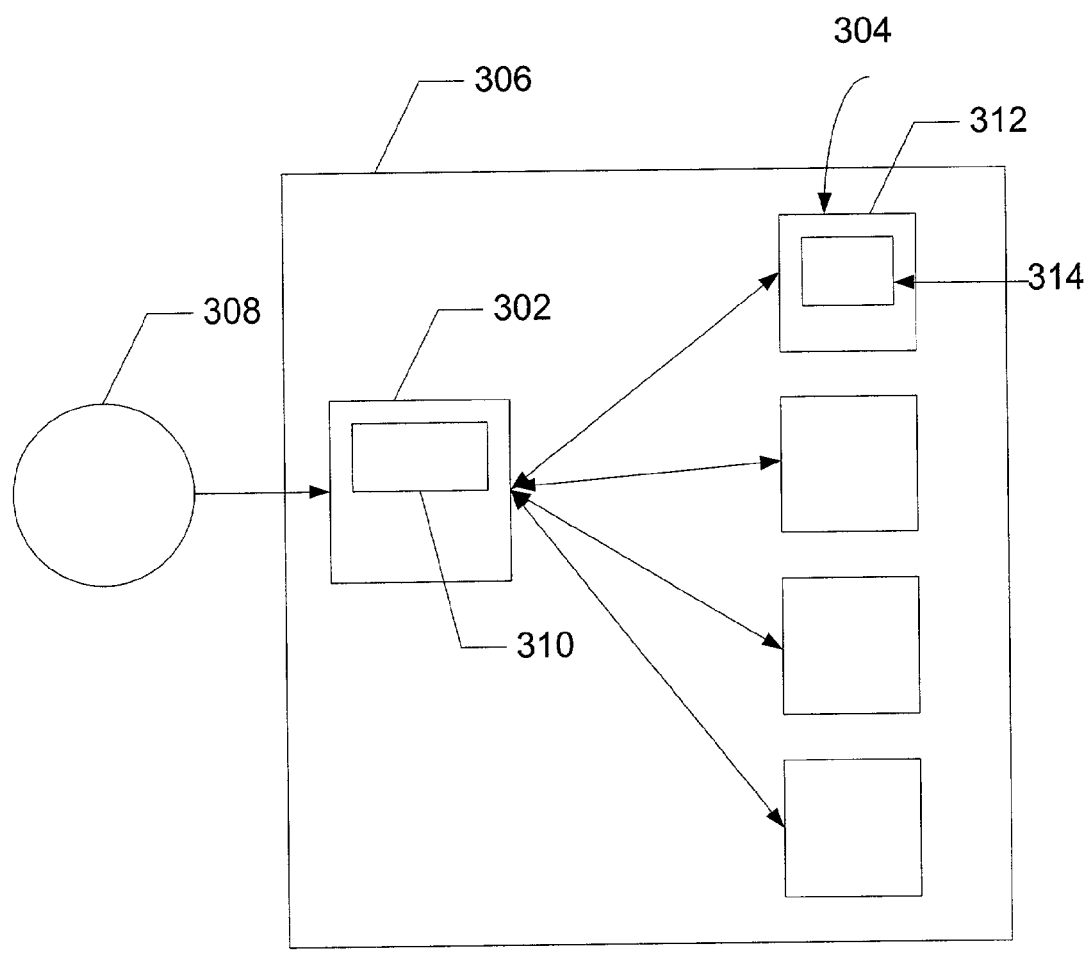
FIG. 3 is a block diagram illustrating a first preferred embodiment of a method for providing an interface with a plurality of wizards in a computer system in accordance with the present invention.

FIG. 3 is a block diagram illustrating a first preferred embodiment of a method for providing an interface with a plurality of wizards in a computer system in accordance with the present invention. First, links on a launch pad 302 is provided, via step 202. The links on the launch pad 302 link to the plurality of wizards 304 which exist on the computer 306. When the user 308 interfaces with the launch pad 302, information pertaining to each wizard 304 is provided. In the preferred embodiment, the launch pad 302 is provided when the user initiates an application. The links may be launch buttons, each button being associated with a wizard. The launch buttons allow the user 308 to determine which wizards 304 are available for the application. To obtain a description of a wizard, the user 308 may hover a pointing device, such as a mouse, over the associated launch button. The launch pad 302 also comprises a first visual object 310 which relates to a task performed by one of the wizards 312. The wizard 312 may then be activated by a mouse click on the launch button. When the link to the wizard 312 is selected, the wizard 312 is provided, via step 204. The wizard 312 comprises a second visual object 314. The second visual object 314 is associated with the first visual object 310 and provides more information concerning the task performed by the wizard 312. Through the association of the first 310 and second 312 visual objects, the user 308 is guided to the correct order in which to execute the wizards 304 and given information as to the effect of the wizard 312.

Computer software may exist on the computer 306 which provides the launch pad 302. But one of ordinary skill in the art will understand that the software may also exist in other places, such as a server, without departing from the spirit and scope of the present invention.

Figure 4A:
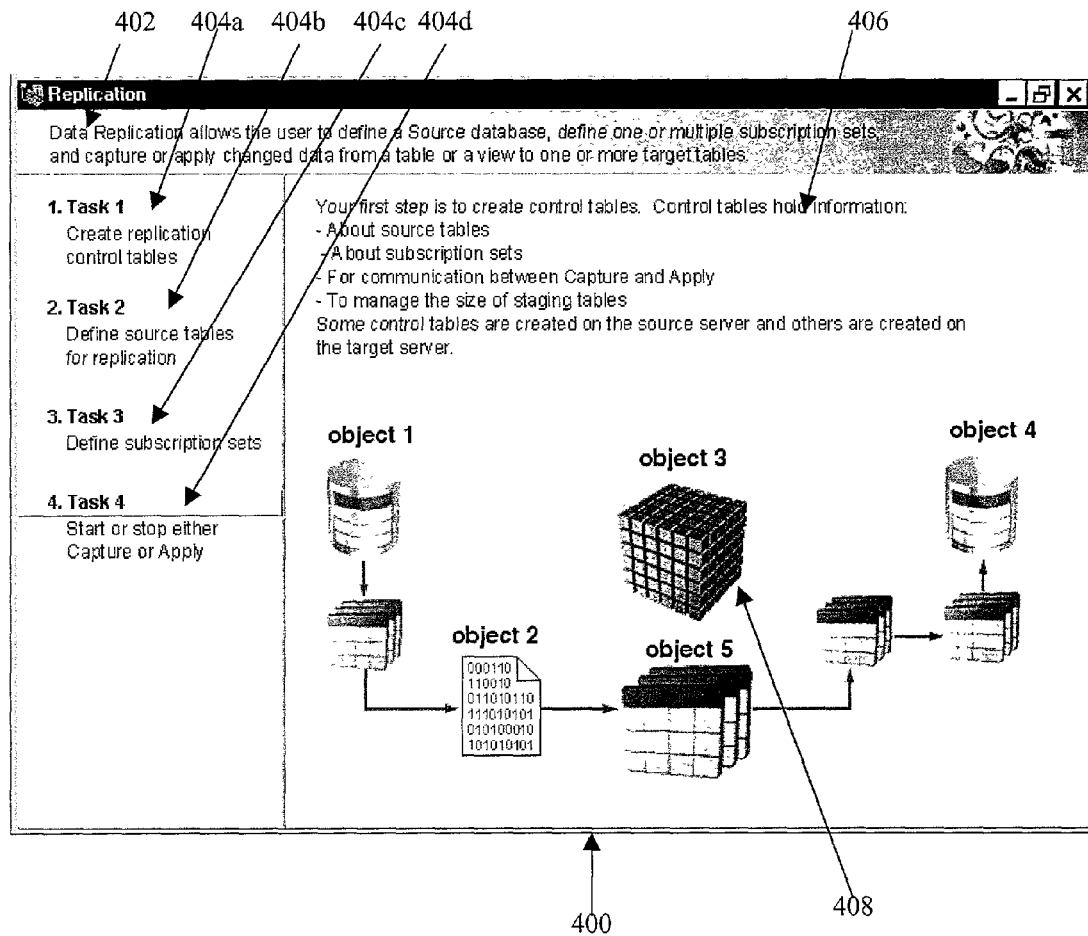
FIGS. 4A and 4B illustrate an example launch pad and wizard in accordance with the present invention.
Figure 4B:
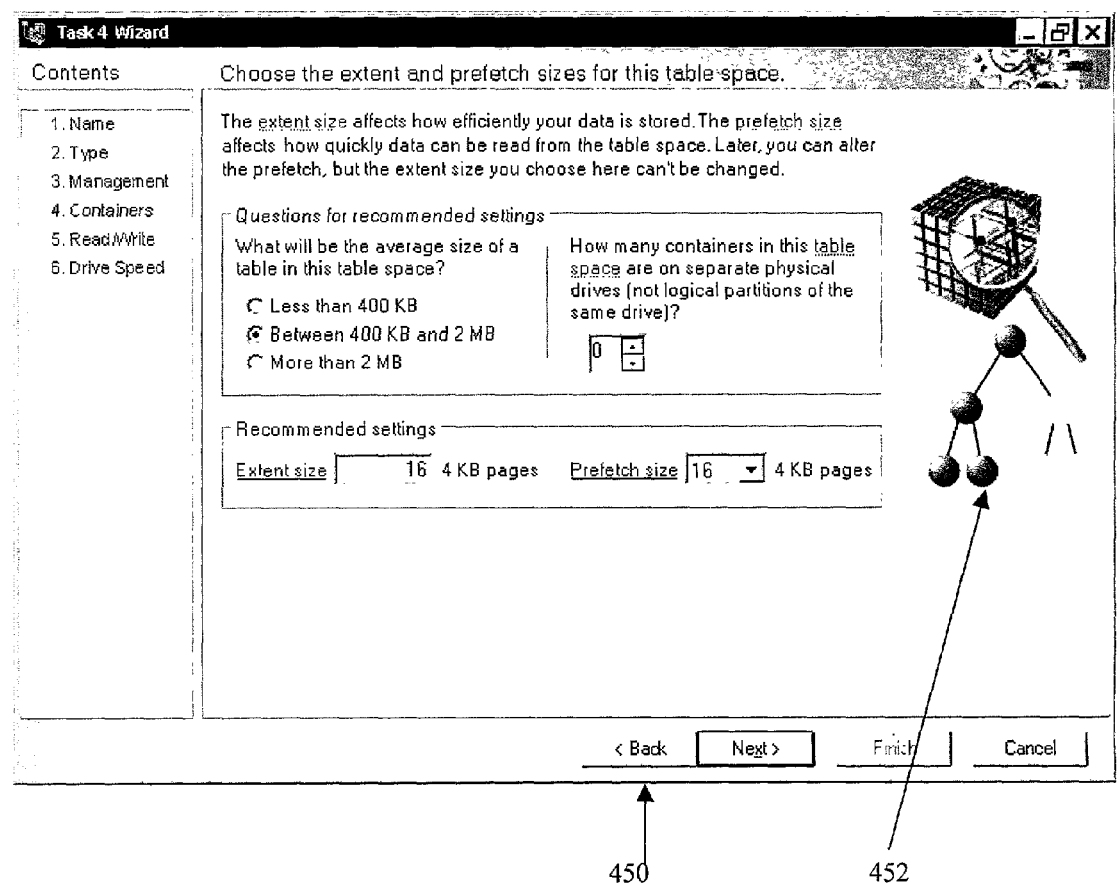

FIGS. 4A and 4B illustrate an example launch pad and wizard in accordance with the present invention. In this example, assume that the user 308 wishes to replicate data in a complex database system. The user 308 initiates the replication application, which in turn initiates the replication launch pad 400, illustrated in FIG. 4A. The replication launch pad 400 comprises a brief description of the replication process 402 and links, or launch buttons 404a–404d. Each launch button 404a–404d links to a wizard which pertains to a task required for data replication. Although the launch buttons 404a–404d are shown displayed vertically, they may be displayed in any configuration without departing from the spirit and scope of the present invention. With each launch button 404a–404d is a short description of the task which each wizard will help the user 308 to perform. The user 308 may obtain more information about each wizard by positioning the mouse pointer over a launch button.

For example, the user 308 can position the mouse pointer over the "Task 4" button 404d. A brief description 406 of the Task 4 wizard appears, explaining the task which this wizard will assist the user 308 to perform, and the effect on the database system. To help the user 308, visual objects, such as visual object 408, are used to graphically illustrate the effect of the wizard. In this example, visual object 408 represents control tables.

When the user 308 selects the Task 4 button 404d, the Task 4 wizard 450 is displayed, as illustrated in FIG. 4B. The wizard 450 comprises a visual object 452 which is associated with the visual object 408 on the launch pad 400. In this example, both visual objects 408 and 452 have a three-dimensional cube comprised of stacked, smaller cubes. However, the visual object 452 on the wizard 450 displays more information concerning Task 4 than the visual object 408. Because both visual objects 408 and 452 contain the cube, the user 308 visually understands that these visual objects 408 and 452 are related. Thus, the information represented by the visual object 408 on the launch pad 400 pertaining to the same task as the information represented by the visual object 452. The association between the visual object 408 on the launch pad 400 and the visual object 452 on the wizard 450 assists the user 308 in understanding the relationship between the replication tasks.

The method in accordance with the present invention may be used with any type of launch pad and/or wizard. FIGS. 5A–7 illustrate example launch pads and wizards.

Figure 5A:
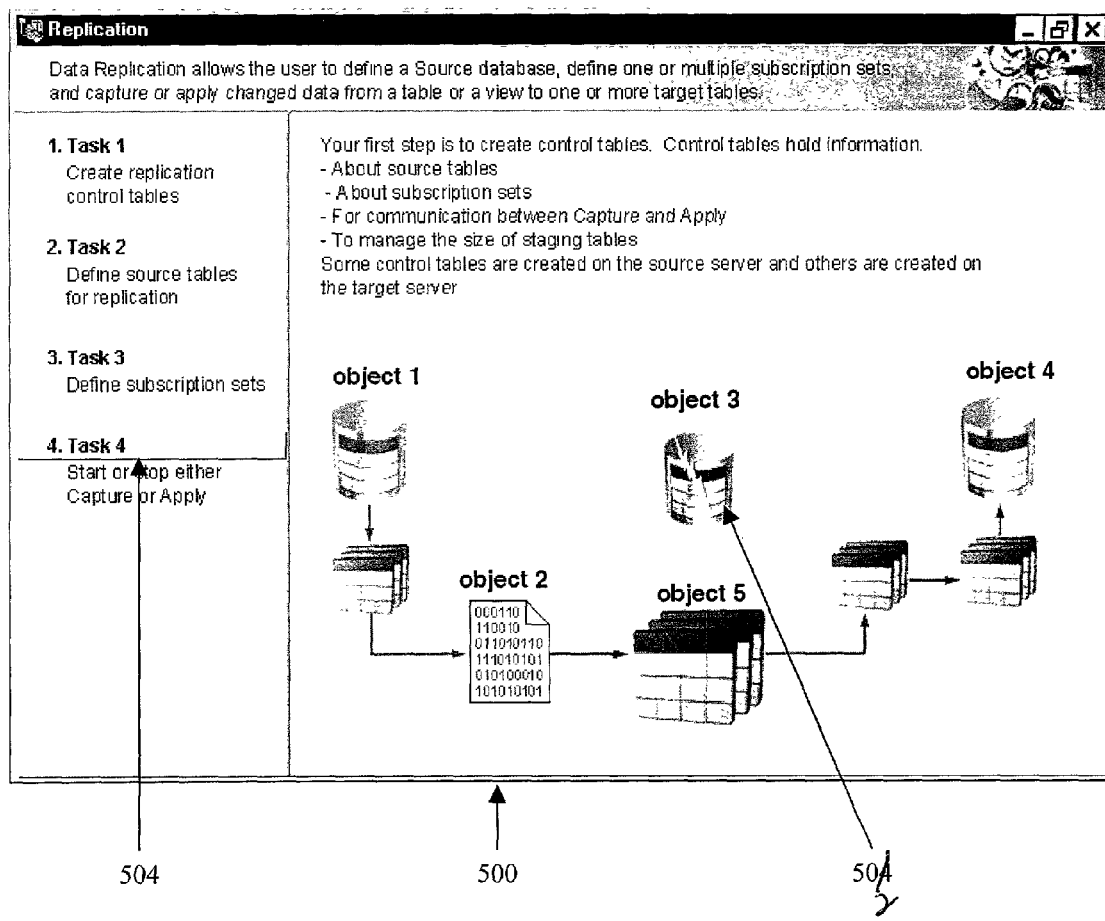
FIGS. 5A and 5B illustrate an example launch pad with a dialog box wizard in accordance with the present invention.
Figure 5B:
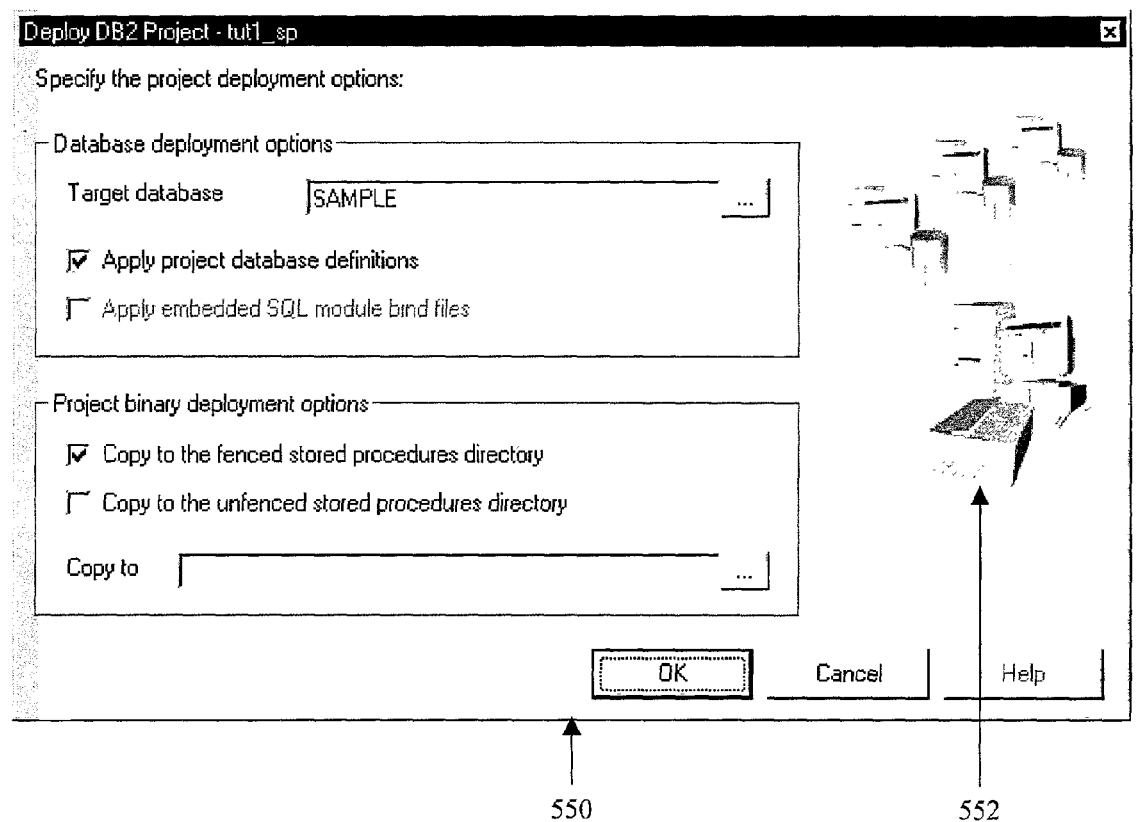

FIGS. 5A and 5B illustrate an example launch pad with a dialog box wizard in accordance with the present invention. As illustrated in FIG. 5A, the launch pad 500 in this example is similar to the launch pad 400 except a different visual object 502 is used to represent the control tables. When the user 308 selects the "Task 4" button 504, the dialog box wizard 550 is displayed, as illustrated in FIG. 5B. The wizard 550 comprises a visual object 552 which is associated with the visual object 502 on the launch pad 500. In this example, both visual objects 502 and 552 have a three-dimensional cylinder and a lightening bolt. However, the visual object 552 on the wizard 550 displays more information concerning Task 4 than the visual object 502. Because both visual objects 502 and 552 contain the cylinder and the lightening bolt, the user 308 visually understands that these visual objects 502 and 552 are related. Thus, the information concerning Task 4 represented by the visual object 502 on the launch pad 500 is related to the information concerning Task 4 represented by the visual object 552 on the dialog box wizard 550.

Figure 6A:
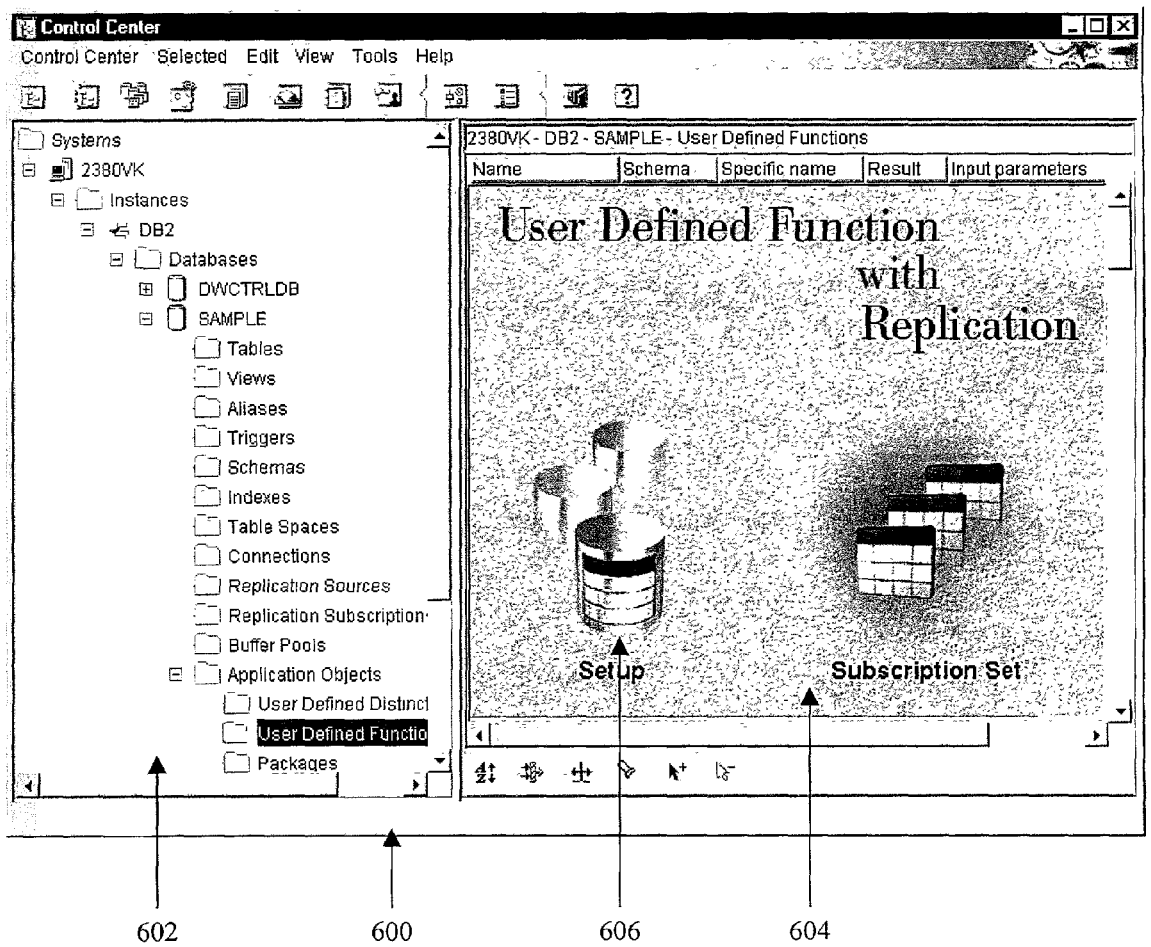
FIGS. 6A and 6B illustrate an example launch pad with a wizard in a Structured Query Language (SQL) server approach in accordance with the present invention.
Figure 6B:
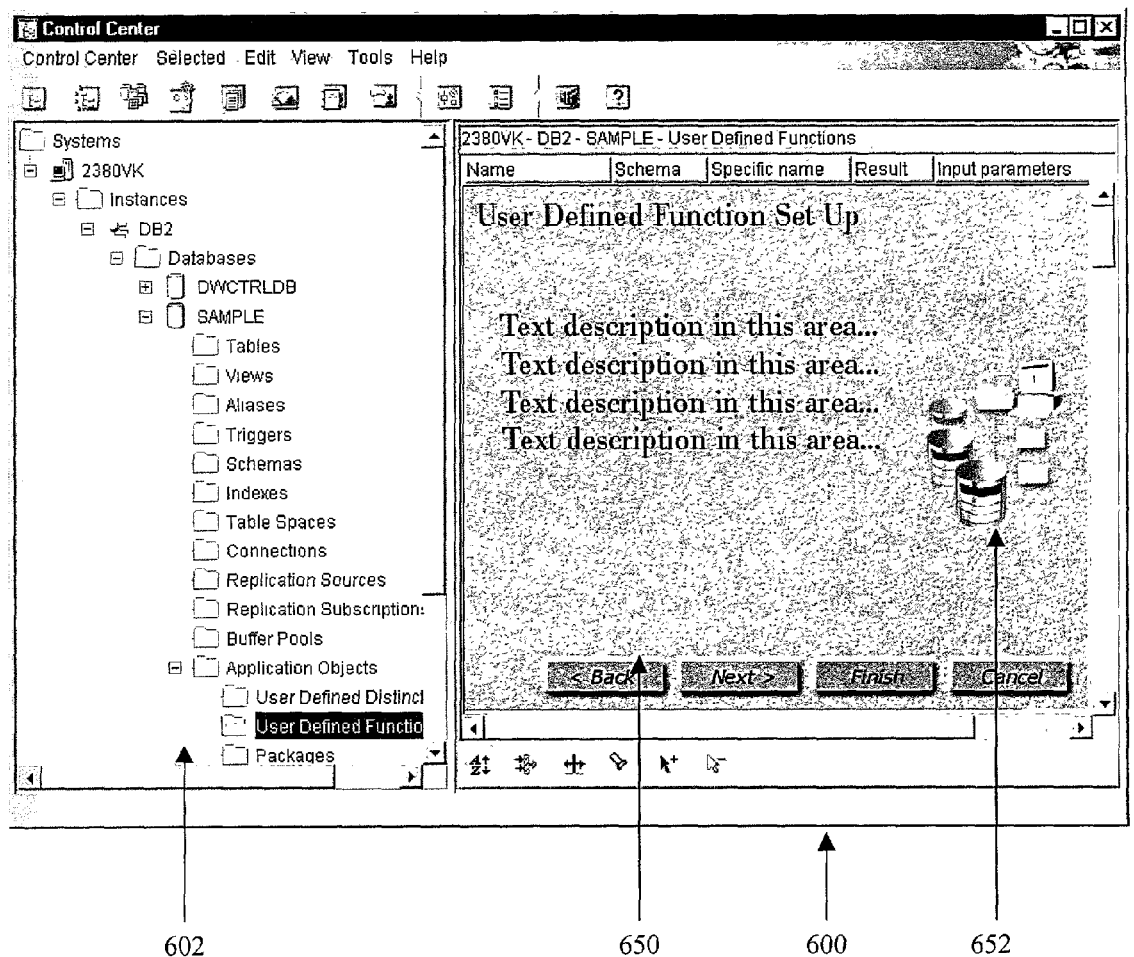

FIGS. 6A and 6B illustrate an example launch pad with a wizard in a Structured Query Language (SQL) server approach in accordance with the present invention. As illustrated in FIG. 6A, the window 600 displays the system tree 602 on the left hand side of the window 600 and the launch pad 604 on the right hand side of the window 600. The user 308 selects a function from the system tree 602, such as the "User Defined Function with Replication" function. The launch pad 602 can display a description of the tasks involved in the function, such as "Setup" and "Subscription Set". In this example, visual object 606 is used to represent the Setup task. As illustrated in FIG. 6B, when the user 308 selects the Setup task, a display of the Set Up wizard 650 replaces the display of the launch pad 604 in the right hand side of the window 600. The wizard 650 comprises a visual object 652 which is associated with the visual object 606 on the launch pad 604. In this example, both visual objects 606 and 652 have three-dimensional cylinders. However, the visual object 652 on the wizard 650 displays more information concerning the Set Up task than the visual object 606 Because both visual objects 606 and 652 contain the cylinders, the user 308 visually understands that these visual objects 606 and 652 are related. Thus, the information concerning the Set Up task represented by the visual object 606 on the launch pad 604 is also related to the information concerning the Set Up task on the wizard 650, as represented by the visual object 652.

Figure 7:
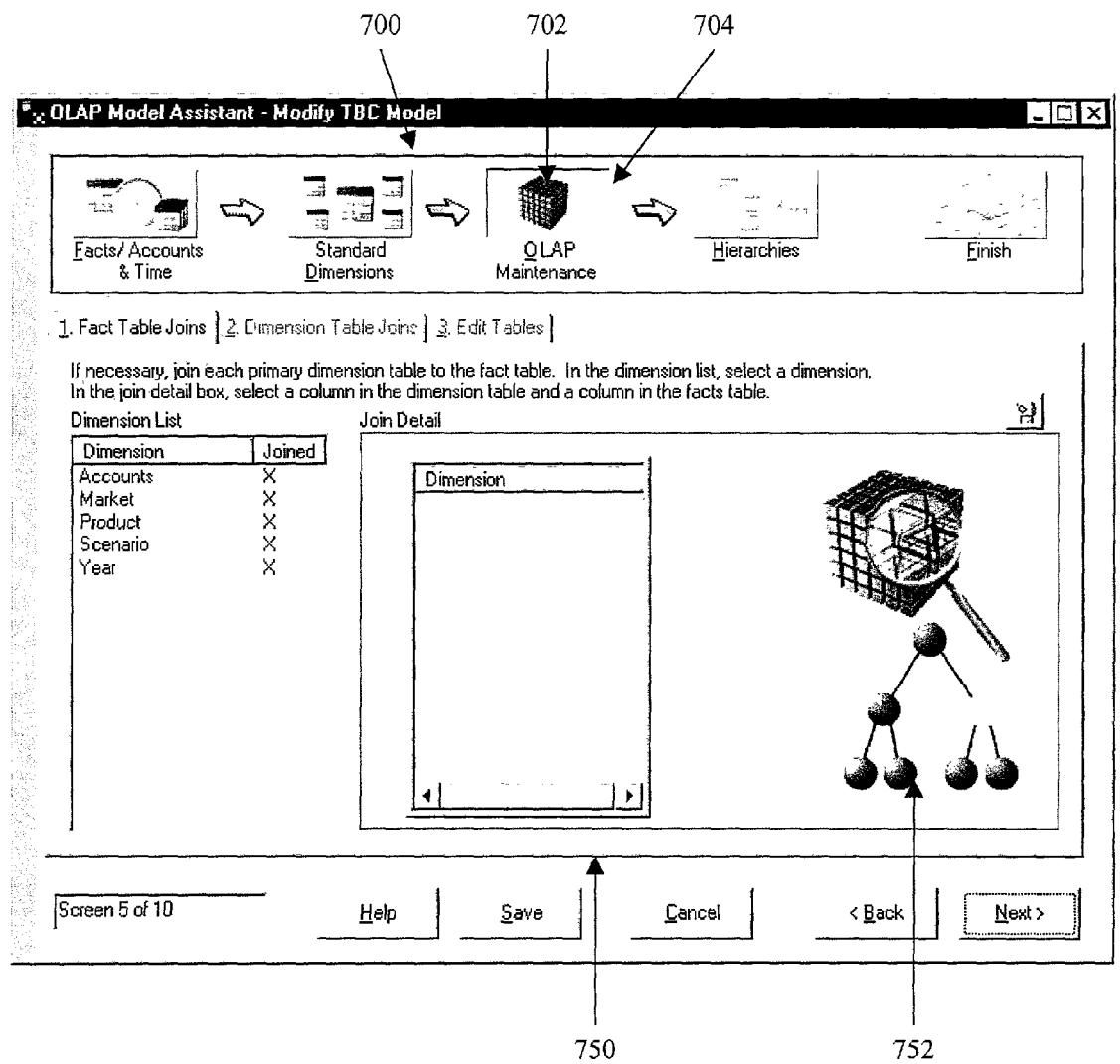
FIG. 7 illustrates an example self-contained launch pad with a wizard on the same display in accordance with the present invention.

FIG. 7 illustrates an example self-contained launch pad with a wizard on the same display in accordance with the present invention. As illustrated in FIG. 7, both the launch pad 700 and the wizards 750 are provided on the same display. In this example, the launch pad 700 uses visual object 702 to represent the task of "OLAP Maintenance" in a series of tasks. When the user 308 selects the "OLAP Maintenance" button 704, the wizard 750 is provided on the same display. The wizard 750 comprises a visual object 752 which is associated with the visual object 702 on the launch pad 700. In this example, both visual objects 702 and 752 have a three-dimensional cube comprised of stacked, smaller cubes. However, the visual object 752 on the wizard 750 displays more information concerning OLAP Maintenance tasks than the visual object 702. Because both visual objects 702 and 752 contain the cube, the user 308 visually understands that these visual objects 702 and 752 are related. Thus, the information concerning the OLAP Maintenance task represented by the visual object 702 on the launch pad 700 is also related to the information concerning the tasks displayed in the wizard 750, as represented by the visual object 752.

Figure 8:
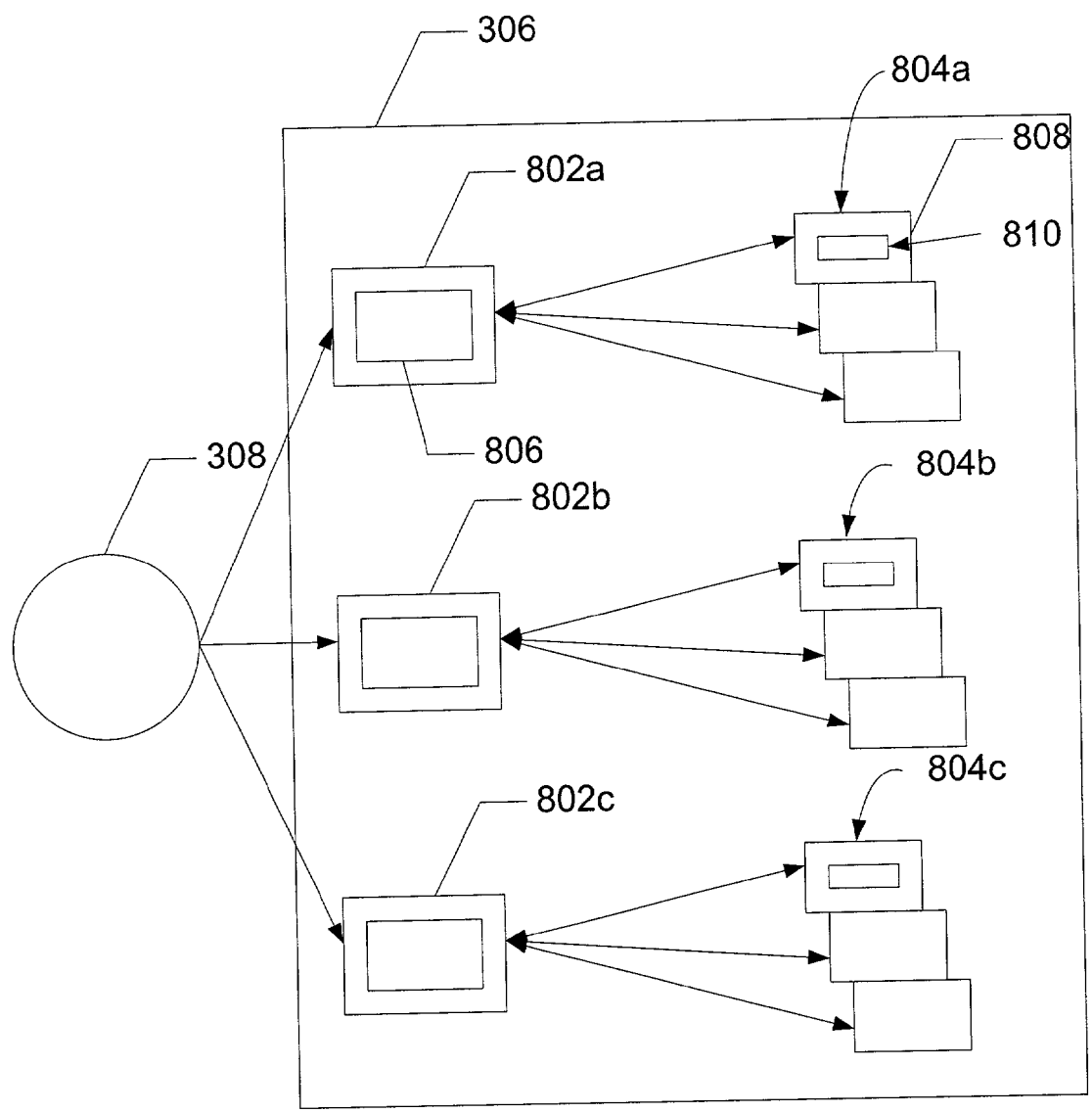
FIG. 8 is a block diagram illustrating a second preferred embodiment of a method for providing an interface with a plurality of wizards in a computer system in accordance with the present invention.

FIG. 8 is a block diagram illustrating a second preferred embodiment of a method for providing an interface with a plurality of wizards in a computer system in accordance with the present invention. In this embodiment, the wizards available on the computer 306 are organized into groups 804a–804c based upon a predetermined criteria, such as function. A plurality of launch pads 802a–802c are used to link to each group 804a–804c of wizards. In this embodiment, when the user 308 initiates one of the processes, the corresponding launch pad 802a, 802b, or 802c, is in turn initiated. For example, assume the launch pad 802a is initiated. The launch pad 802a comprises a first visual object 806 which provides information concerning a task performed by the wizard 808. The user 308 may select a link which displays the wizard 808. The wizard 808 comprises a second visual object 810 which is associated with the first visual object 806. The second visual object 810 displays more information concerning the task performed by the wizard 808 than the first visual object 806. The user 308 may interact with each launch pad 802a–802c in the same manner as described above.

Figure 9:
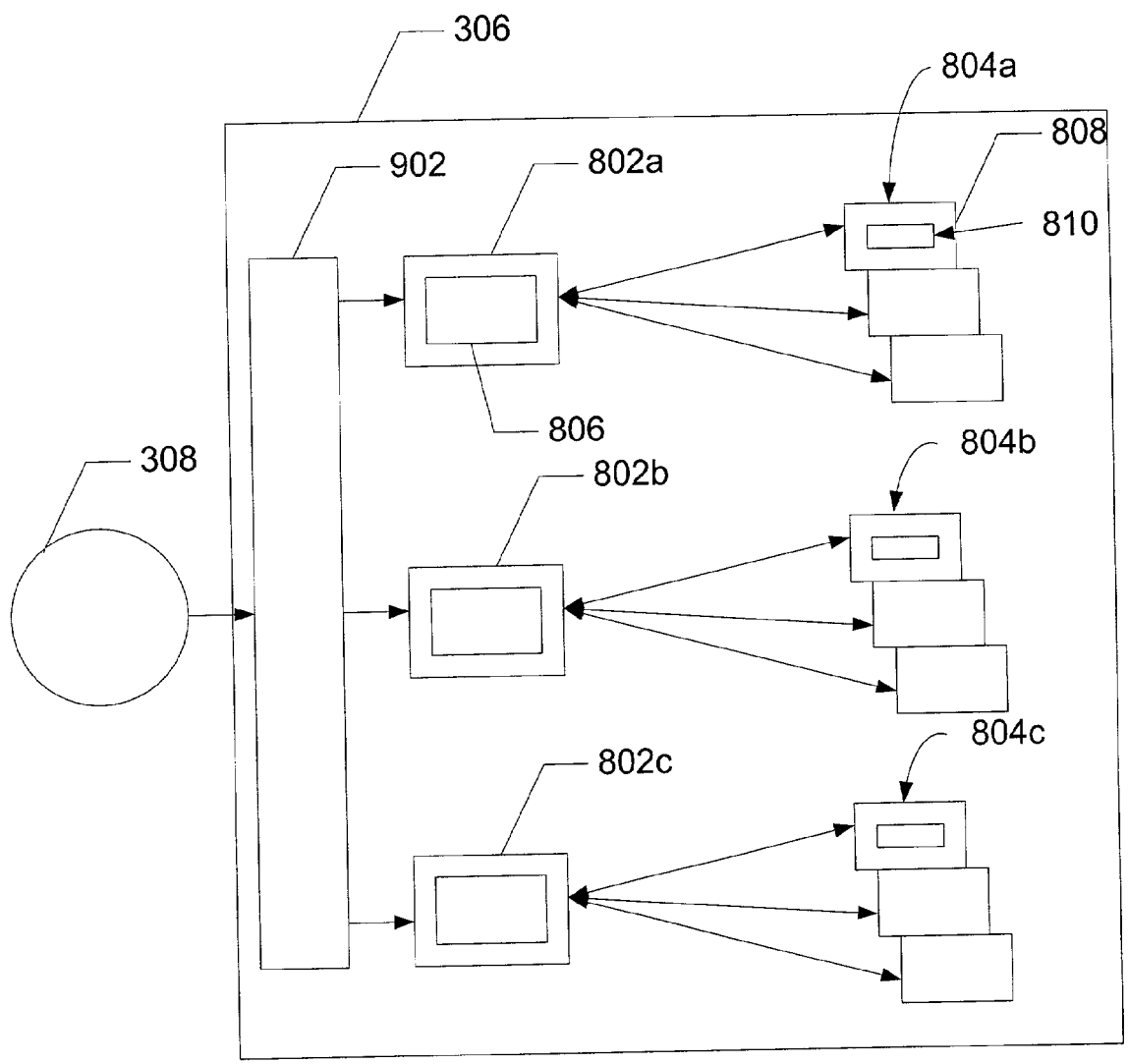
FIG. 9 is a block diagram illustrating a third preferred embodiment of a method for providing an interface with wizards in a computer system in accordance with the present invention.

FIG. 9 is a block diagram illustrating a third preferred embodiment of a method for providing an interface with wizards in a computer system in accordance with the present invention. In this embodiment, a main menu 902 of launch pads is provided to the user 308 with which the user 308 may select the function-specific launch pad 802a–802c. The user 308 may then interact with the selected launch pad in the same manner as described above.

The launch pads provided to the user 308 may be predefined. However, to provide flexibility, a toolkit may be provided as well to enable developers to build their own launch pads.

A method for providing launch pads on the display of a computer system as interactive interfaces between a user and wizards have been disclosed. A launch pad comprises a first visual object, and the wizard comprises a second visual object which is associated with the first visual object. In the preferred embodiment, the first visual object in the launch pad relates to the task performed by the wizard. The second visual object in the wizard provides more information concerning the task than the first visual object. In this manner, a user is provided a visual connection between the information provided on the launch pad and the information provided on the wizard concerning the task performed by the wizard.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for interfacing with a plurality of wizards in a computer system, comprising the steps of:
   (a) providing a plurality of links on a launch pad, wherein each link is associated with one of the plurality of wizards, wherein the launch pad comprises a first visual object corresponding to a wizard of the plurality of wizards, wherein the first visual object is separate from the link associated with the corresponding wizard, wherein the first visual object provides information pertaining to a task performed by the corresponding wizard; and
   (b) providing the corresponding wizard when the link associated with the corresponding wizard is selected, wherein the corresponding wizard comprises a second visual object, wherein the second visual object is associated with the first visual object, wherein the second visual object provides more information pertaining to the task performed by the corresponding wizard than the first visual object.

2. The method of claim 1, wherein the first or the second visual object is a graphical element which represents hardware and/or software elements of an application affected by the execution of the corresponding wizard.

3. A method for interfacing with a plurality of wizards in a computer system, comprising the steps of:
   (a) providing a plurality of launch pads on a display of the computer system;
   (b) receiving a selection of one of the plurality of launch pads, wherein the selected launch pad is associated with a group of wizards;
   (c) providing a plurality of links on the selected launch pad, wherein each link is associated with one of the group of wizards associated with the selected launch pad, wherein the selected launch pad comprises a first visual object corresponding to a wizard of the group of wizards associated with the selected launch pad, wherein the first visual object is separate from the link associated with the corresponding wizard, wherein the first visual object provides information pertaining to a task performed by the corresponding wizard; and
   (d) providing the corresponding wizard when the link associated with the corresponding wizard is selected, wherein the corresponding wizard comprises a second visual object, wherein the second visual object is associated with the first visual object, wherein the second visual object provides more information pertaining to the task performed by the corresponding wizard than the first visual object.

4. The method of claim 3, wherein the first or the second visual object is a graphical element which represents hardware and/or software elements of an application affected by the execution of the corresponding wizard.

5. A method for interfacing with a plurality of wizards in a computer system, comprising the steps of:
   (a) providing a plurality of launch pads on a display of the computer system;
   (b) providing a menu of the plurality of launch pads on the display;
   (c) receiving a selection of one of the plurality of launch pads from the menu, wherein the selected launch pad is associated with a group of wizards;
   (d) providing a plurality of links on the selected launch pad, wherein each link is associated with one of the group of wizards associated with the selected launch pad, wherein the selected launch pad comprises a first visual object corresponding to a wizard of the group of wizards associated with the selected launch pad, wherein the first visual object is separate from the link associated with the corresponding wizard, wherein the first visual object provides information pertaining to a task performed by the corresponding wizard; and
   (e) providing the corresponding wizard when the link associated with the corresponding wizard is selected, wherein the corresponding wizard comprises a second visual object, wherein the second visual object is associated with the first visual object, wherein the second visual object provides more information pertaining to the task performed by the corresponding wizard than the first visual object.

6. The method of claim 5, wherein the first or the second visual object is a graphical element which represents hardware and/or software elements of an application affected by the execution of the corresponding wizard.

7. A computer readable medium with program instructions for interfacing with a plurality of wizards, comprising the instructions for:
   (a) providing a plurality of links on a launch pad, wherein each link is associated with one of the plurality of wizards, wherein the launch pad comprises a first visual object corresponding to a wizard of the plurality of wizards, wherein the first visual object is separate from the link associated with the corresponding wizard, wherein the first visual object provides information pertaining to a task performed by the corresponding wizard; and
   (b) providing the corresponding wizard when the link associated with the corresponding wizard is selected, wherein the corresponding wizard comprises a second visual object, wherein the second visual object is associated with the first visual object, wherein the second visual object provides more information pertaining to the task performed by the corresponding wizard than the first visual object.

8. The medium of claim 7, wherein the first or the second visual object is a graphical element which represents hardware and/or software elements of an application affected by the execution of the corresponding wizard.

9. A computer readable medium with program instructions for interfacing with a plurality of wizards, comprising the instructions for:
   (a) providing a plurality of launch pads on a display of the computer system;
   (b) receiving a selection of one of the plurality of launch pads, wherein the selected launch pad is associated with a group of wizards;
   (c) providing a plurality of links on the selected launch pad, wherein each link is associated with one of the group of wizards associated with the selected launch pad, wherein the selected launch pad comprises a first visual object corresponding to a wizard of the group of wizards associated with the selected launch pad, wherein the first visual object is separate from the link associated with the corresponding wizard, wherein the first visual object provides information pertaining to a task performed by the corresponding wizard; and
   (d) providing the corresponding wizard when the link associated with the corresponding wizard is selected, wherein the corresponding wizard comprises a second visual object, wherein the second visual object is associated with the first visual object, wherein the second visual object provides more information pertaining to the task performed by the corresponding wizard than the first visual object.

10. The medium of claim 9, wherein the first or the second visual object is a graphical element which represents hardware and/or software elements of an application affected by the execution of the corresponding wizard.

11. A computer readable medium with program instructions for interfacing with a plurality of wizards in a computer system, comprising the instructions for:
   (a) providing a plurality of launch pads on a display of the computer system;
   (b) providing a menu of the plurality of launch pads on the display;
   (c) receiving a selection of one of the plurality of launch pads from the menu, wherein the selected launch pad is associated with a group of wizards;
   (d) providing a plurality of links on the selected launch pad, wherein each link is associated with one of the group of wizards associated with the selected launch pad, wherein the selected launch pad comprises a first visual object corresponding to a wizard of the group of wizards associated with the selected launch pad, wherein the first visual object is separate from the link associated with the corresponding wizard, wherein the first visual object provides information pertaining to a task performed by the corresponding wizard; and
   (e) providing the corresponding wizard when the link associated with the corresponding wizard is selected, wherein the corresponding wizard comprises a second visual object, wherein the second visual object is associated with the first visual object, wherein the second visual object provides more information pertaining to a task performed by the corresponding wizard than the first visual object.

12. The medium of claim 11, wherein the first or the second visual object is a graphical element which represents hardware and/or software elements of an application affected by the execution of the corresponding wizard.

* * * * *